No. 769,973. PATENTED SEPT. 13, 1904.
L. WILSON.
MEANS FOR PROTECTION AGAINST REVERSAL OF ENERGY.
APPLICATION FILED NOV. 2, 1903.
NO MODEL.
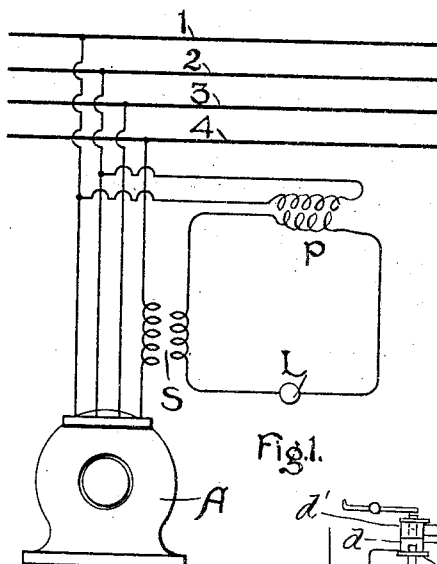
Fig.1.
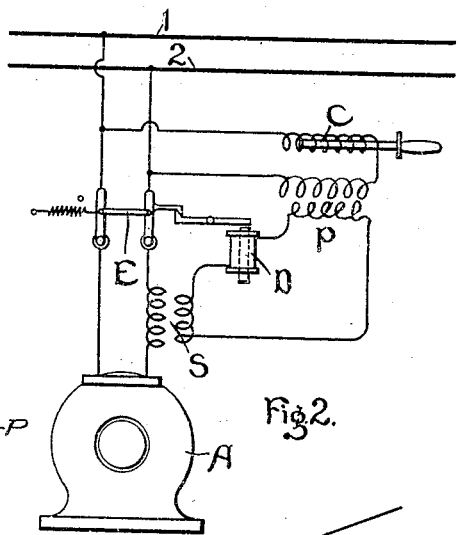
Fig.2.
Fig.5.
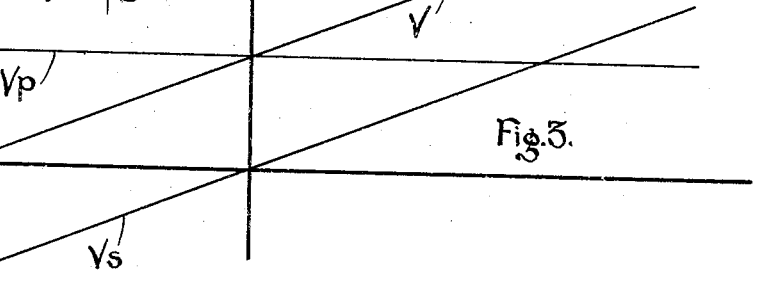
Fig.3.
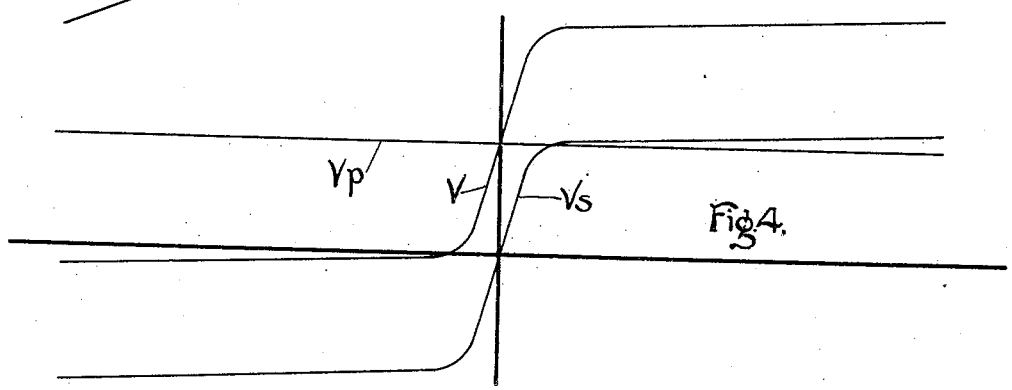
Fig.4.
WITNESSES:
R. E. Haynes
Wm. H. Jones
INVENTOR.
Leonard Wilson.
BY
L. A. Hawkins
ATTORNEY.

No. 769,973.

Patented September 13, 1904.

UNITED STATES PATENT OFFICE.

LEONARD WILSON, OF PITTSFIELD, MASSACHUSETTS, ASSIGNOR TO STANLEY ELECTRIC MANUFACTURING COMPANY, OF PITTSFIELD, MASSACHUSETTS, A CORPORATION OF NEW JERSEY.

MEANS FOR PROTECTION AGAINST REVERSAL OF ENERGY.

SPECIFICATION forming part of Letters Patent No. 769,973, dated September 13, 1904.

Application filed November 2, 1903. Serial No. 179,491. (No model.)

*To all whom it may concern:*

Be it known that I, LEONARD WILSON, a subject of the King of England, and a resident of Pittsfield, Massachusetts, have invented certain new and useful Improvements in Means for Protection Against Reversal of Energy, of which the following is a specification.

My invention relates to devices for protecting alternating-current apparatus against a reversal of energy. Where a number of generators are connected in parallel to a common set of bus-bars and one of the generators fails for any reason, as by the opening of the field-circuit, a current reversed in phase relative to the voltage flows from the bus-bars to the generator, which may damage the generator as well as throwing an unnecessary load onto the other machines. In such cases it has been proposed to use a device responsive upon relative reversal of current-flow, which depends upon the differential effect of two electromotive forces impressed upon it in series, one of the electromotive forces depending in phase on the voltage of the bus-bars or the generator-leads, and the other electromotive force depending in phase on the current in the generator-leads. Thus when the current in the generator-leads reverses in phase relative to the voltage the relative direction of the two electromotive forces is reversed, and this reversal is taken advantage of for operating the reverse-current protective device. Such an arrangement has been described in an application for United States Letters Patent, Serial No. 163,010, Leonard Andrews. A potential-transformer is connected to the bus-bars or to the generator-leads, and a series transformer is connected in series with one of the generator-leads, the secondaries of the two transformers being connected in series to the protective device. In this arrangement using series transformers as ordinarily constructed in which the core is not saturated at full load the secondary voltage is proportionate to the current flowing in the primary. Consequently the differential voltage applied to the protective device varies gradually with the amount of current-flow.

The object of my invention is to provide means for protecting alternating-current generators in parallel and other similar devices in such a way that the protective device will operate positively whether the amount of relatively reversed current is great or little.

In the accompanying drawings, Figures 1 and 2 show arrangements embodying my invention. Figs. 3 and 4 are explanatory diagrams. Fig. 5 shows a modification of the arrangement of Fig. 2.

Referring first to Fig. 3, an illustration is given of the state of affairs when the ordinary series transformer with an unsaturated core is used. In the lines here shown the abscissas represent values of current in the generator-leads, while the ordinates represent corresponding values of voltages on the secondaries of the transformers. The line $V_p$ represents the voltage across the terminals of the secondary of a potential-transformer. The voltage on the line is assumed to be constant, and consequently the line $V_p$ is the same distance above the axis of X for all values of current-flow—that is to say, the line $V_p$ is a straight line parallel to the axis of X. The line $V_s$ represents the voltage on the secondary of a series-transformer of the ordinary type with unsaturated core. The voltage on the secondary in this case varies directly with the current in the generator-leads—that is to say, the line $V_s$ is a straight line passing through the junction of axes X and Y. The line V is the resultant of the two voltages, and it is evident that this line will be straight and inclined to the axis of X. Accordingly with such an arrangement the voltage on the protective device varies gradually, according to the current in the generator-leads, and no clearly-defined point of demarcation for the operation of the circuit-breaker can be secured.

Fig. 4 shows the voltage-curves which may be obtained by means of my invention. The line $V_p$ is the same as in Fig. 3, but the line $V_s$ represents the voltage at the terminals of the secondary of a series transformer so built that the core becomes saturated with a small amount of current flowing in the generator-leads. The curve V*s* rises steeply from the intersection of the axes and then, as the point of saturation is reached, becomes nearly parallel to the axis of X. The curve V shows the resultant of the potentials shown by the lines V*p* and V*s*. It is plain from this curve that a sharply-defined line of demarcation may be drawn beyond which the tripping device will positively act. This line may correspond to a reverse-current, which is any desired proportion of the full-load current to the generator, by designing the series transformer so that its core is saturated by that proportion of the full-load current.

The use of a saturated core introduces another feature into the problem, since the phase relation of the current in the primary and the voltage on the secondary of the series transformer is altered by saturating the core. In transformers the primary current on no load consists of two components. One of these components is the magnetizing-current, which is ninety degrees out of phase with the induced secondary electromotive force. The other component of the primary current is the energy component which furnishes the copper losses, which are so small as to be negligible, and also the iron losses, including hysteresis and eddy-currents, which are comparatively large in a transformer with an unsaturated core. Thus in transformers as ordinarily constructed, with the core of sufficient size to be far from saturated, the energy component of the primary no-load current is sufficiently great to produce a phase displacement of the primary current from the secondary induced electromotive force of more nearly one hundred and eighty degrees than ninety degrees. If, however, the total magnetic flux is reduced, as by inserting an air-gap in the core or by reducing the cross-section of the core, the relative size of the energy component decreases and the resultant primary current is more nearly in phase with the magnetizing-current—that is, is displaced little more than ninety degrees from the induced secondary electromotive force. This is the case in a transformer having a saturated core such as I propose to use. Instead of the currents in the windings of the transformer being nearly one hundred and eighty degrees apart, as is the case in an ordinary transformer with an unsaturated core, the currents in the two windings are now a little more than ninety degrees apart. Consequently if the current in the primary of the series transformer were in phase with the voltage impressed on the primary of the potential-transformer the electromotive forces of the two secondaries would be nearly ninety degrees out of phase and successful operation of the protective devices would be difficult to secure. I remove this difficulty by impressing a voltage upon the primary of the potential-transformer nearly ninety degrees out of phase with the current in the primary of the series transformer. Thus in the arrangement shown in Fig. 1 the two-phase generator A is connected to the four bus-bars 1 2 3 4. I connect the series transformer S in a lead of one phase 3 4, while the potential-transformer P is connected across the leads of the other phase 1 2. Thus the electromotive forces produced by the secondaries of the two transformers S and P are practically in phase and may be impressed in series upon the lamp or other indicating device L. As shown by curve V in Fig. 4, the voltage on lamp L rises to a maximum or falls to a minimum with a reversal of current very small in amount. In Fig. 2 a single-phase generator A is shown connected to bus-bars 1 2. In this case in order to secure the displacement of phase of the voltage impressed upon the primary of the potential-transformer P, I make use of the variable choke-coil C in series with the primary of P. By this means the voltage impressed upon the primary of P may be displaced nearly ninety degrees. Moreover, in place of the lamp or indicating device L, I have shown the solenoid D connected in series with the secondaries of the two transformers S and P. This solenoid operates the tripping device for the switch E, thereby disconnecting generator A from the bus-bars upon a reversal of current of a small amount.

It is evident that where such a protective device as solenoid D is used, instead of a single winding connected in series with the two transformer-secondaries two windings may be used, each connected to one of the transformer-secondaries. This arrangement is shown in Fig. 5, the solenoid D being provided with two coils *d* and *d'*, connected, respectively, to the secondaries of the transformers S and P. This is simply using the magnetic resultant instead of the electric resultant in the two secondaries. It, however, has the disadvantage that current is flowing in the secondaries all the time, whereas when the single winding is used, which is connected in series with both secondaries, no current flows in the transformer-secondaries except upon reversal of the current in the generator-leads.

I do not desire to limit myself to the particular construction and arrangement of parts here shown, since changes therein which do not depart from the spirit of my invention and which are within the scope of the appended claims will be obvious to those skilled in the art.

Having thus fully described my invention, I claim as new and desire to protect by Letters Patent—

1. In combination, an alternating-current generator, a potential-transformer, a series transformer having a core adapted to be saturated by a fraction of the full-load current of said generator, an electroresponsive device connected to the secondaries of said transformers, and means for compensating for the relative phase displacement of the secondary voltages of said transformers due to the saturation of said core.

2. In combination, a polyphase generator, a potential-transformer connected to one phase thereof, a series transformer connected to another phase thereof and having a core adapted to be saturated by a fraction of the full-load current of said generator, and an electroresponsive device connected to the secondaries of said transformers.

3. In combination, an alternating-current generator, a potential-transformer, a phase-shifting device in series with the primary of said transformer, a series transformer having a core adapted to be saturated by a fraction of the full-load current of said generator, and an electroresponsive device connected to the secondaries of said transformers.

4. In combination, an alternating-current generator, a potential-transformer, a series transformer having a core adapted to be saturated by a fraction of the full-load current of said generator, an electroresponsive device connected in series with the secondaries of said transformers, and means for compensating for the relative phase displacement of the secondary voltages of said transformers due to saturation of said core.

5. In combination, an alternating-current generator, a series transformer having a core adapted to be saturated by a fraction of the full-load current, a potential-transformer having impressed on its primary a voltage displaced in phase from the current in the primary of said series transformer, and an electroresponsive device connected to the secondaries of said transformers.

6. In combination, an alternating-current generator, a series transformer having a core adapted to be saturated by a fraction of the full-load current, a potential-transformer having impressed on its primary a voltage displaced in phase from the current in the primary of said series transformer, and an electroresponsive device connected in series with the secondaries of said transformers.

7. In combination, an alternating-current generator, bus-bars, leads from said generator to said bus-bars, a series transformer having its primary in series with one of said leads and having a core adapted to be saturated by a current less than the full-load current of the generator, a potential-transformer connected to a source of potential displaced in phase from the current in the primary of said series transformer, and an electroresponsive device connected to the secondaries of said transformers.

8. In combination, an alternating-current generator, bus-bars, leads from said generator to said bus-bars, a series transformer having its primary connected in series with one of said leads and having a core adapted to be saturated by a current less than the full-load current of said generator, a potential-transformer having impressed on its primary a voltage dependent in phase on the voltage of said bus-bars but displaced in phase from the current in the primary of said series transformer, and an electroresponsive device connected to the secondaries of said transformers.

Signed at Pittsfield, Massachusetts, this 28th day of October, 1903.

LEONARD WILSON.

Witnesses:
   L. A. HAWKINS,
   R. E. HAYNES.